(12) United States Patent
Cox

(10) Patent No.: US 8,365,936 B2
(45) Date of Patent: Feb. 5, 2013

(54) ELECTRICAL ENCLOSURE REMOVABLE BACKPLATE

(76) Inventor: Christopher E Cox, Baton Rouge, LA (US)

( * ) Notice: Subject to any disclaimer, the term of this patent is extended or adjusted under 35 U.S.C. 154(b) by 0 days.

(21) Appl. No.: 13/045,590

(22) Filed: Mar. 11, 2011

(65) Prior Publication Data

US 2011/0162880 A1 Jul. 7, 2011

Related U.S. Application Data

(60) Continuation of application No. 12/040,430, filed on Feb. 29, 2008, now Pat. No. 7,908,746, which is a division of application No. 11/457,287, filed on Jul. 13, 2006, now Pat. No. 7,348,499.

(51) Int. Cl.
*H02G 3/08* (2006.01)

(52) U.S. Cl. ......... 220/3.3; 220/4.02; 29/592.1; 29/832; 29/842; 174/520; 174/549; 174/559; 361/699; 361/702; 361/727

(58) Field of Classification Search ................. 29/592.1, 29/832, 842; 174/520, 549, 559; 220/3.3, 220/4.02

See application file for complete search history.

(56) References Cited

U.S. PATENT DOCUMENTS

| | | | |
|---|---|---|---|
| 3,180,670 A | 4/1965 | Pryde | |
| 3,808,504 A | 4/1974 | Rabie | |
| 3,956,674 A | 5/1976 | Farley | |
| 3,991,264 A | 11/1976 | Connell | |
| 4,890,318 A * | 12/1989 | Crane et al. | 379/413.02 |
| 5,206,796 A | 4/1993 | Thompson et al. | |
| 5,249,979 A | 10/1993 | Deinhardt et al. | |
| 5,425,169 A | 6/1995 | Steinman et al. | |
| 5,434,368 A | 7/1995 | Hoffman | |
| 5,737,194 A | 4/1998 | Hopkins et al. | |
| 5,811,729 A * | 9/1998 | Rintz | 174/66 |
| 6,060,660 A * | 5/2000 | Bauer | 174/60 |
| 6,253,121 B1 | 6/2001 | Cline et al. | |
| 6,263,121 B1 | 7/2001 | Melen et al. | |
| 6,443,322 B1 | 9/2002 | Braun et al. | |
| 6,462,958 B2 | 10/2002 | Ogata | |
| 6,466,453 B2 | 10/2002 | Kobayashi | |
| 6,558,190 B1 | 5/2003 | Pierson | |
| 6,642,446 B2 | 11/2003 | Dodds et al. | |
| 6,947,288 B2 | 9/2005 | Simmons et al. | |
| 7,067,734 B2 | 6/2006 | Abe et al. | |
| 7,212,412 B2 | 5/2007 | Carlson et al. | |
| 7,348,499 B1 | 3/2008 | Cox | |
| 7,908,746 B2 | 3/2011 | Cox | |

OTHER PUBLICATIONS

US As International Searching Authority, Search Report and Written Opinion, dated Jul. 7, 2008, for PCT/US2008/052199.
WIPO International Publication, Int'l. Publication No. WO 2009/096943 A1, publication date Aug. 6, 2009, for International Application No. PCT/US2008/052199 filed Jan. 28, 2008, for Applicant: Christopher E. Cox.

* cited by examiner

*Primary Examiner* — Anthony Stashick
*Assistant Examiner* — Elizabeth Volz
(74) *Attorney, Agent, or Firm* — Jones Walker Waechter Poitevent Carrere & Denegre, LLP

(57) ABSTRACT

An electrical enclosure that includes a sidewall, a back and a top, defining an interior. The top of the enclosure is adapted to open and provide access to the interior. The enclosure includes a backplane mounted to the interior of the enclosure. The backplane has an upstanding leg on which in interior swing panel door is hingedly attached.

6 Claims, 6 Drawing Sheets

INSERT A

ELECTRICAL ENCLOSURE REMOVABLE BACKPLATE

CROSS REFERENCE TO RELATED APPLICATIONS

This application is a continuation of U.S. patent application Ser. No. 12/040,430, filed on Feb. 29, 2008, which application was a divisional of U.S. patent application Ser. No. 11/457,287 filed on Jul. 13, 2006, now U.S. Pat. No. 7,348,499. This application claims the priority benefits of these applications, and hereby incorporates each by reference.

FIELD OF INVENTION

The invention relates to electrical enclosures, and more particularly, electrical enclosures with removable backplanes.

BACKGROUND OF THE INVENTION

Electrical enclosures are cases used to protect the electrical components stored inside the enclosure. The electrical components are mounted on a backplane or backplate (backplane and backplate are used interchangeably) or panel that is secured or mounted to the interior of the enclosure case. The backplane may be predrilled with a series of openings to accommodate electrical components. Typical enclosures are rectangular boxes constructed of metals such as steel, or fiberglass or plastic. The enclosure generally has a top cover or door that can be opened to provide access to the electrical components mounted in the panel. The cover, when closed, provides a degree of protection for the electrical components against moisture and other adverse environmental conditions. Electrical wiring penetrates the enclosure typically through conduits or similar devices that are secured to the enclosure using specialized fittings.

Some enclosures include an inner swing panel or interior cover plate that is exposed when the enclosure cover is opened. The interior cover plate generally is mounted on the enclosure behind the door or enclosure cover. The interior cover plate or inner swing panel is used to mount switches, circuit breakers, gauges, lamps or other components that the operator may need to periodically access for various reasons, but still protect the electrical components mounted on the backplate. The interior cover plate can be moved to provide access to the interior of the enclosure. Generally, the inner swing panel is hingedly connected to the enclosure, but can be screw mounted, toggle mounted or otherwise removable. An example of such an enclosure is shown in FIG. 1. Shown are enclosure 1, cover 2, and interior swing panel 3. The interior swing panel 3 shown in FIG. 1 is hingedly mounted to the enclosure, as is the cover plate 2. To accommodate a hingedly mounted interior swing panel, many enclosures include an interior projection support bracket attached to the interior of the enclosure opposite the hinged side of the interior swing panel (not shown). This bracket is used to support the interior swing panel in a closed position.

In assembling an enclosure, the electrical components will be installed and wired as needed to the backplane. The backplane is then inserted into the interior of the enclosure and secured to the enclosure (usually, by corner screw mounts installed at suitable locations in the interior of the enclosure). The door components are added (either to the interior cover plate, inner swing panel or enclosure cover or both) as well as components mounted in the exterior of the enclosure (such as warning lamps, alarms or lightning arresters), and wired to the backplane as needed. The assembled enclosure is then transported to the field, where suitable enclosure cutouts are installed through the enclosure to accommodate the incoming conduits or other devices. In some instances the enclosure cutouts can be placed in the device in the assembly plant, if a high degree of tolerance is expected in the field installation.

The assembled enclosure is then mounted at its desired location, and conduits attached, providing power and control wiring to enter or exit the interior of the enclosure. Once the enclosure is assembled, mounted and conduits attached, removal of the outer enclosure is difficult, as the conduit must be disassembled and moved, and this may have to be initiated at a location remote from the enclosure. Hence, servicing of components in the enclosure generally entail field service of the components on the backplane while the backplane is installed. Removal of the backplane from a fully installed enclosure is very difficult or impossible. The conduits and other devices that are mounted on the exterior of the enclosure or the inner swing panel have an interior extent—that is, the conduit or other devices extends into the interior of the enclosure and presents a physical obstacle to lifting the backplane off the mounts and out of the interior. The backplane, to be removed, would require removal of the interior penetrations of the conduit or other exterior mounted devices, that is, a disassembly of the field mounting of the enclosure. In most cases this is not possible without undesirable lengthy shut down of equipment and excessive costs.

In instances where extensive re-hab of the electrical components are required (for instance, due to flooding) or where new designs require for extensive replacement of components, a complete new enclosure and backplane may be required in the field to "swap" out with the existing installed enclosure. Such a procedure is expensive and time consuming. It would be beneficial to be able to remove the backplane from the enclosure without disassembling the field mount. While the exterior electrical connections to the backplane would have to be broken, the integrity of the field mounted enclosure would not be broken. The ability to remove the backplane and the attached electrical components without disturbing the enclosure field mount is desirable.

SUMMARY OF THE INVENTION

The invention provides for an easily removable backplane from a mounted electrical enclosure. The invention generally combines all interior components into one "bucket" style module which can be easily removed allowing for complete replacement of the module, leaving the main enclosure permanently field mounted. To assist in removal, the backplane has a hinged cover plate mounted to the backplane, generally mounted on upstanding legs positioned on the backplane. The invention will be described in the context of an enclosure for a sewage lift station, but should not be limited to this particular application.

BRIEF DESCRIPTIONS OF THE DRAWINGS

PREFERRED EMBODIMENT OF THE INVENTION

A typical sewage lift station consists of pit, pump, floats for pump activation and a control panel. The lift stations can be located in populous areas such as subdivisions and are susceptible to tampering or vandalism. This requires that the controls be tamper resistant, and hence all the controls, switches, lights and the like are mounted and sealed in an outer enclosure. The outer enclosure of the control panel may be made of many materials, including steel, aluminum, plastic or fiberglass. The controls needed to operate the lift station are usually located inside the enclosure mounted on a backplane, typically a plate (not necessarily flat) which may also be made of various materials. The backplane may be pre-perforated for mounting typical electrical components. Typically, a specific pump control panel is designed for the application, and the design implemented by assembling the needed electrical components onto the backplane, wired appropriately, and the assembled backplane is then tested in a facility specializing in control panel manufacturing prior to field installation.

Figure 1:
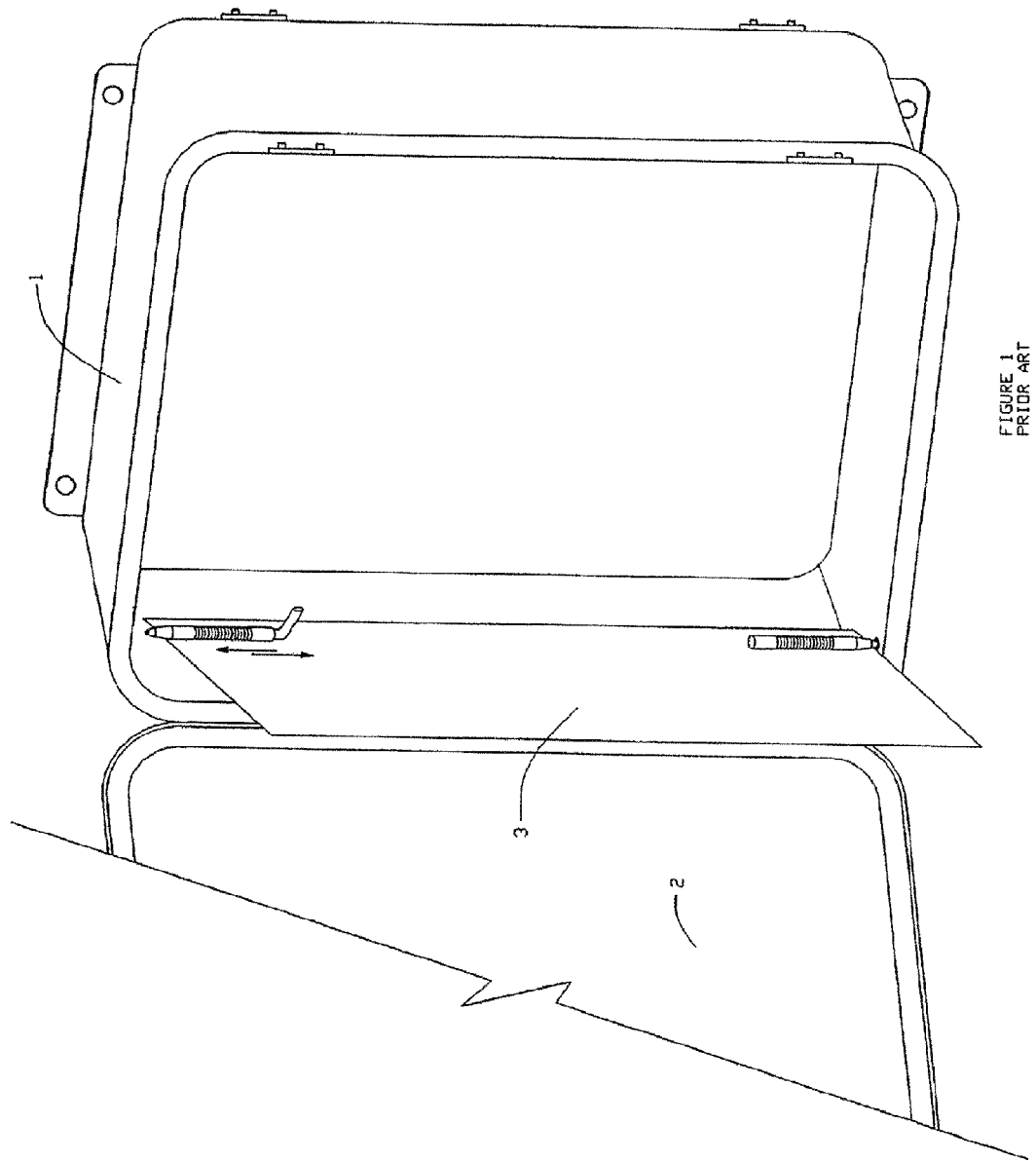
FIG. 1 is a perspective view of a prior art enclosure.
Figure 2:
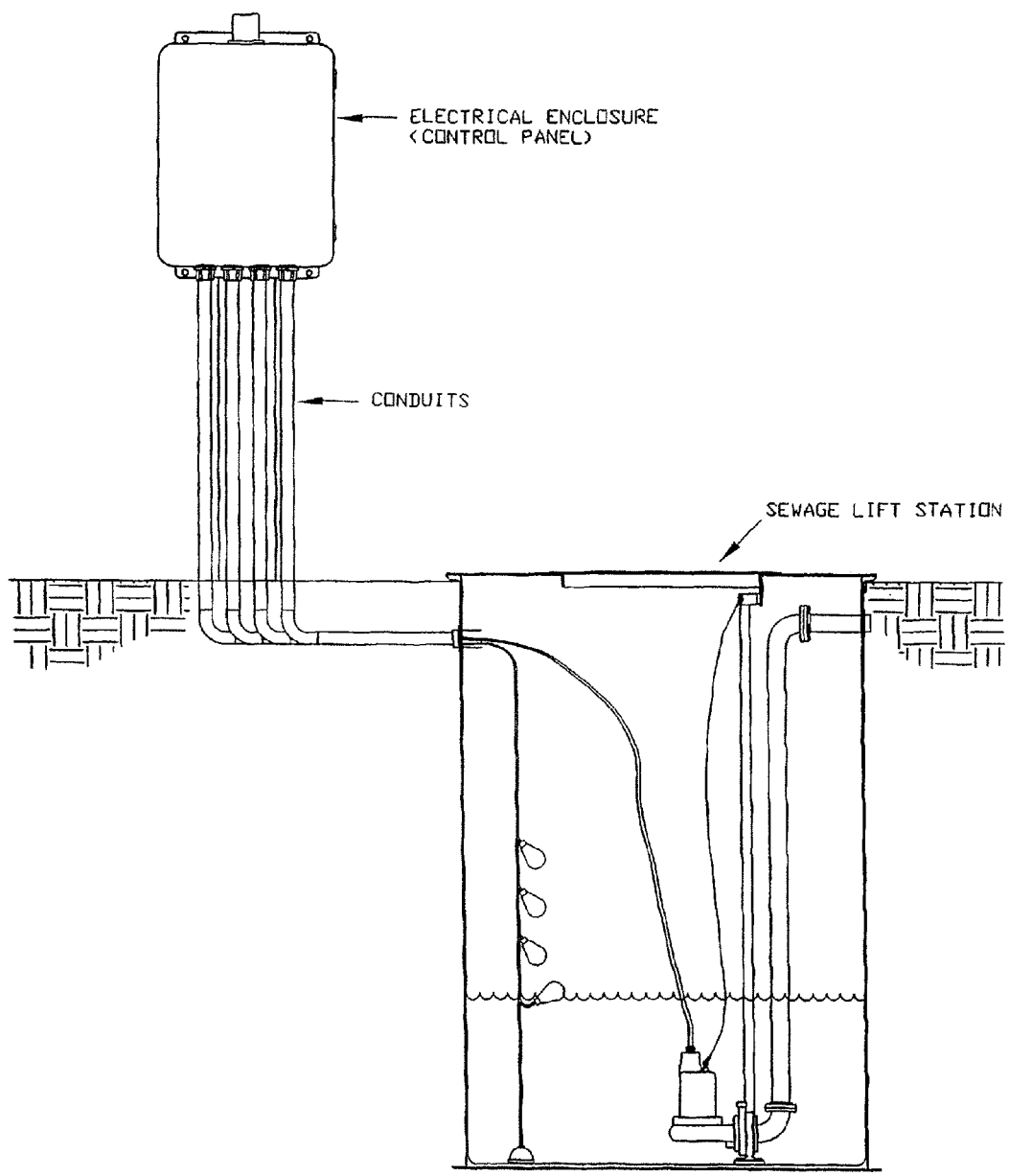
FIG. 2 is a schematic of a pump station showing the electrical enclosure used in the station.
Figure 3:
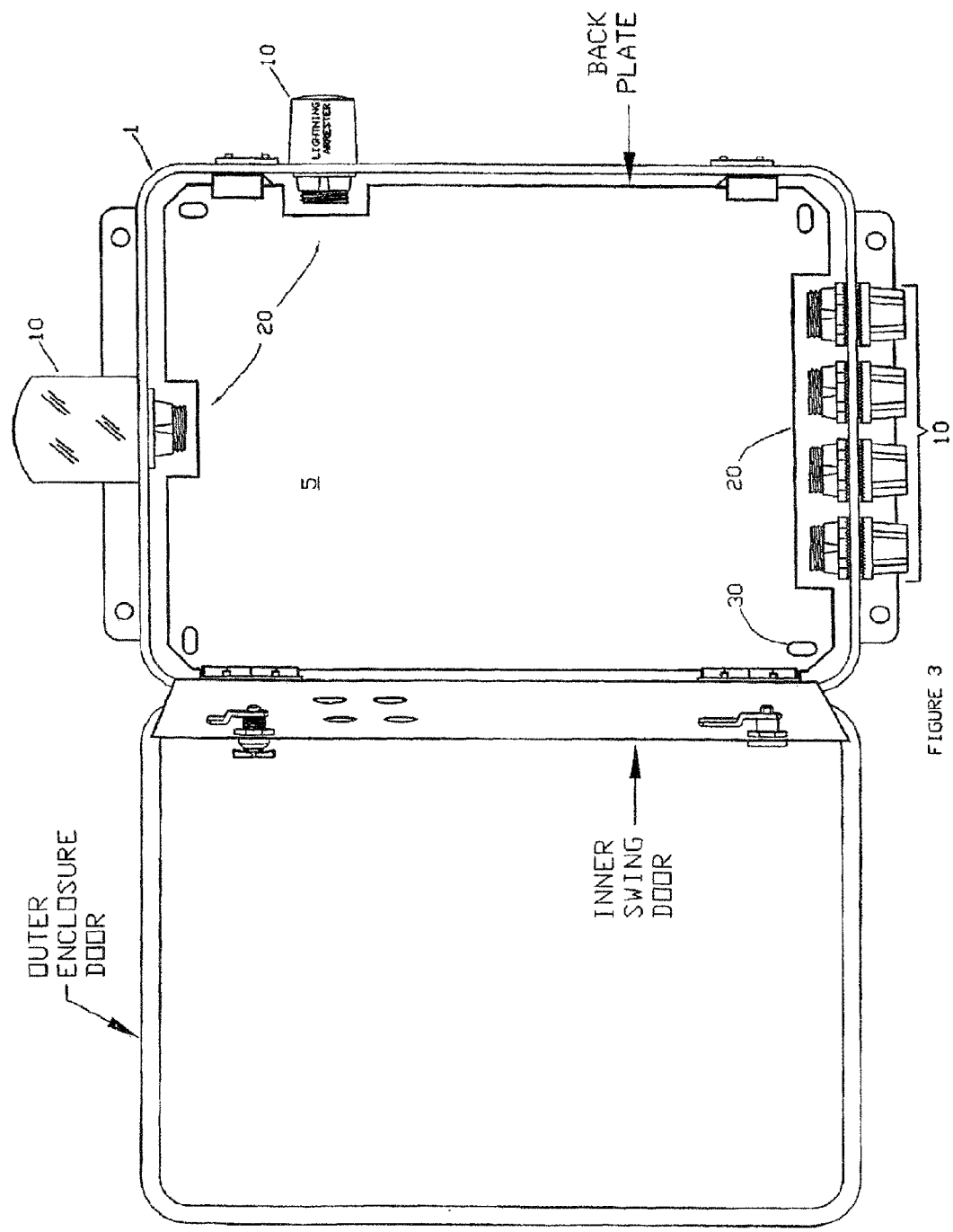
FIG. 3 is a front view of an enclosure showing the backplane installed.
Figure 4:
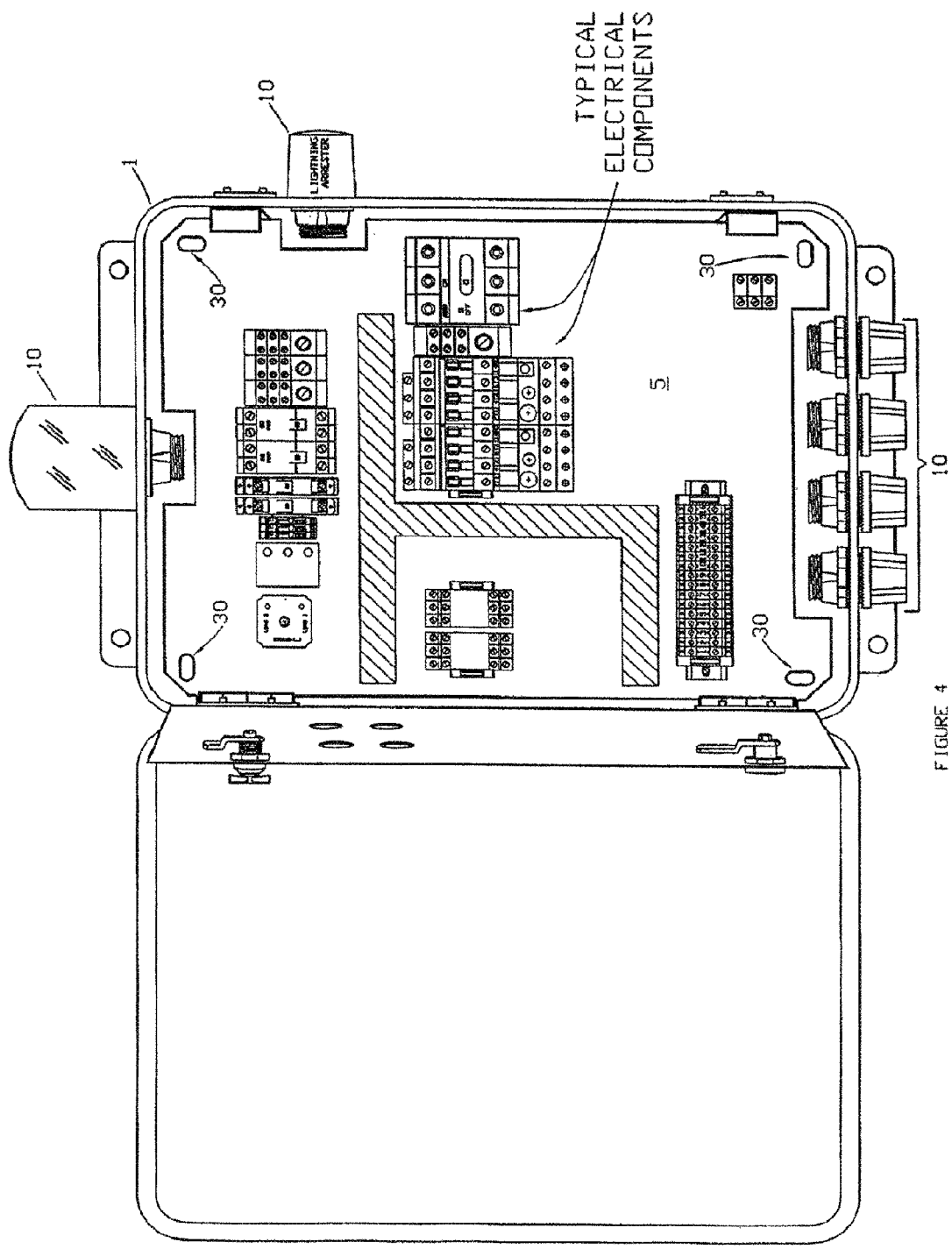
FIG. 4 is a front view of the enclosure of FIG. 3 with components mounted on the backplane.

The sewage lift station control panel consists of an enclosure (shell), an inner backplane and electrical components which are mounted on an interior cover plate or inner swing panel (not to be mistaken with the outer enclosure door). The enclosure has a sidewall, a back and a top, where the top can be opened to provide access to the enclosure interior. As shown, the top is a cover that is hinged to the sidewall. The interior cover plate or inner swing panel door usually contains lights, switches and meters, counters or timers. The outer enclosure has mounted on it various components 10 that penetrate the enclosure, 1 such as alarm lights, lightning arrestors, and conduit penetrations that protrude into the enclosure, as shown in FIG. 3. These interior protrusions restrict the removal of an installed backplane 5. Periodic repair and upgrade of controls is commonly performed on sewage lift stations, in which case, the entire control panel, enclosure and all internal components must be removed from its mounted field location and sent back to the factory for upgrade or repair or removed and replaced with a new enclosure (to minimize down time). To enable the backplane to be removed as a module (removal of all components mounted on the backplane), the backplane will have notches or cut-outs 20 in the backplane that are substantially aligned with components 10 mounted on the enclosure, to allow the backplane 5 to be lifted out of the enclosure 1, providing the needed clearance past those components mounted on the enclosure that penetrate into the interior. See FIGS. 3 and 4. As can be seen in FIGS. 3 and 4, the number of cutouts 20 can be less than the number of obstructions 10, as a single cutout 20 can accommodate a number of obstructions 10. For instance, the bottom backplane cutout of FIGS. 3 and 4 accommodates four conduit attachments. Alternatively, the backplane 5 may have a hinged portion or a detachable portion that can be removed or rotated up and out of the way to provide the needed clearance over obstructions in the enclosure's interior (not shown).

Shown in FIG. 4 is the backplane with installed components positioned on the backplane 5 in the interior of the enclosure 1. The backplane or plate is mounted to the interior of the enclosure 1, generally by bolts through openings 30 on backplane into an aligned bolt mount positioned on the enclosure interior. To remove the backplane and mounted components, the wiring on those devices 10 that connected to the backplane must be disconnected. After disconnection, the bolts holding the backplane to the enclosure are removed, and the entire backplane module (backplane+installed components) can be easily removed without disassembly of the filed installation of the enclosure itself.

Figure 5:
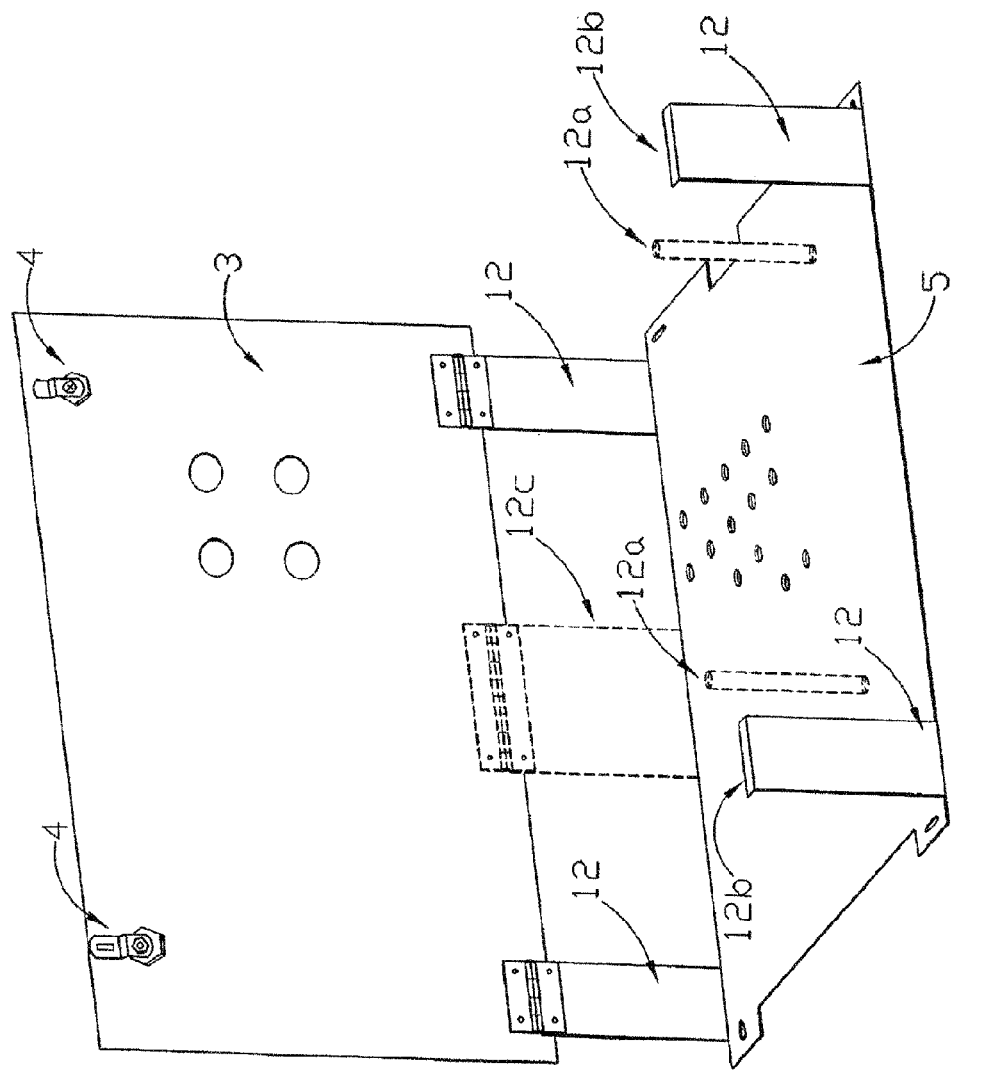
FIG. 5 is a prospective view of the backplane/inner swing panel assembly.

As mentioned above, the enclosure may include two covers, an exterior cover and an interior cover. The interior cover may have devices mounted on the interior cover, but these devices would not be mounted onto the exterior cover. In this instance, it may be desirable to remove the backplane and interior cover at the same time. In this instance, the interior cover should be attached to the backplane to allow the assembly to be extracted as a unit. Such an assembly is shown in FIG. 5. Shown is backplane 5, with cover support 12, shown as upstanding legs 12a. The interior cover 3 is attached to one pair of legs. Obviously, instead of a pair of legs, a cover support 12c (shown as dashed in FIG. 5) could be used.

As shown in FIG. 5, the interior cover plate is an inner swing panel 3 that is hingedly attached to the cover support 12. Instead of being hingedly attached, the interior cover plate could be attached to the legs by screws, bolts, latches or other attachment means. As shown in FIG. 5, one pair of legs is used to attach the inner swing panel 3 to the cover support 12, and the opposing pair of upstanding legs 12 is used to support the swing panel 3 when closed. In this embodiment, inner swing panel 3 has latches 4 that interface with a horizontal tab 12b positioned on the cover support to allow the interior cover to latch. In some installations, the opposing support legs may not be required, as the interior cover, if suitably sized, could rest on a lip formed by the enclosure. Instead of upstanding legs 12, upstanding posts 12a could be used, as shown by the dashed posts in FIG. 5. These posts could be screwed to or bolted to the backplane.

Figure 6:
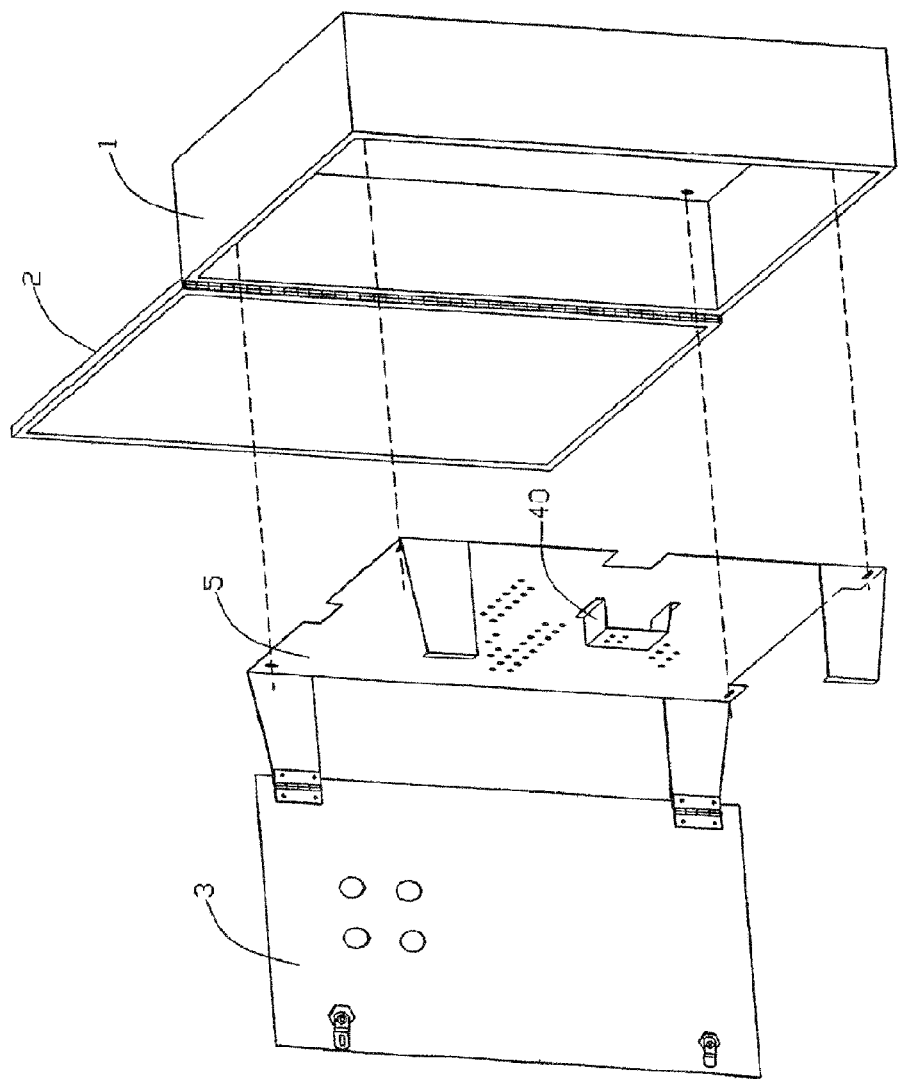
FIG. 6 is an exploded view showing the backplane/inner swing panel assembly and enclosure.

FIG. 6 shows how the backplane 5 is removably inserted into the enclosure. Also shown in FIG. 6 is a raised platform 40 mounted on the backplane. Such a raised platform is used to mount switches and lights and other devices when there is no inner swing panel for mounting. To assist in removal, the backplane (or inner swing panel) can be equipped with handles or grab bars. The invention, as described, provides a one piece module that allows a factory to build a new module and ship it to the lift station in need of repair or upgrade. The old module would then be removed from the existing enclosure and the new module installed quickly and easily. This insures the lift station is non operational for only a short period of time. The invention allows the control panel manufacturer to have a set of standardized modules so as to allow a "module only" assembled backplane to be shipped in the event of rehab or replacement of an existing module.

I claim:

1. An electrical enclosure comprising an enclosure having an exterior sidewall, a back and a top, defining a substantially closed interior, said top adapted to open and provide access to said interior, and a backplane, said backplane mounted to said enclosure in to the interior of said enclosure and said backplane sized to be removable from said interior through said top of said enclosure when opened, said backplane having at least one upstanding leg, and an interior cover plate supported by at least one of said upstanding legs, wherein said interior cover plate is hingedly mounted on at least one of said upstanding leg in a vertically spaced relationship with said backplane, said interior cover slate being located substantially in the interior of the enclosure when said open top is closed, said interior cover plate and said backplane are capable of being removed from the interior of said enclosure as a single unit.

2. The electrical enclosure of claim 1 wherein a subset of said upstanding legs comprise pegs mounted on said backplane or said interior cover plate.

3. The electrical enclosure of claim 1 wherein said exterior sidewall comprises a left exterior sidewall, a right exterior sidewall, a top exterior sidewall and a bottom exterior sidewall.

4. The electrical enclosure of claim 1 wherein at least one of said upstanding legs comprises a handle or grab bar.

5. The electrical enclosure of claim 1 wherein the enclosure is electrically coupled to pumps contained in a sewage lift station.

6. A mounted electrical enclosure comprising an enclosure having an exterior sidewall, a back plate and a top plate, defining a substantially closed interior, said top plate adapted to open and provide access to said interior, and a backplane, said backplane mounted to the interior of said enclosure, said backplane sized to be removable from said interior through an opening created when said top plate is opened, said backplane having at least two upstanding legs, and an interior cover plate supported by at least one of said upstanding legs, wherein said interior cover plate is hingedly mounted on at least one of said upstanding legs, said enclosure being fixedly mounted, and a conduit coupled to said enclosure, said interior cover plate being located substantially in the interior of the enclosure when said top plate is closed; said interior cover plate, in cooperation with said enclosure, being closable into a covering relationship to said backplane in said interior of said enclosure; said interior cover plate and said backplane being capable of being removed from the interior of said enclosure as a single unit.

* * * * *